(12) United States Patent
Bortnikov et al.

(10) Patent No.: US 10,361,995 B2
(45) Date of Patent: Jul. 23, 2019

(54) MANAGEMENT OF CLUSTERED AND REPLICATED SYSTEMS IN DYNAMIC COMPUTING ENVIRONMENTS

(71) Applicant: International Business Machines Corporation, Armonk, NY (US)

(72) Inventors: Vita Bortnikov, Haifa (IL); Guy Laden, Jaffa (IL); Bruno Wassermann, Haifa (IL); Idan Zach, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/935,796

(22) Filed: Nov. 9, 2015

(65) Prior Publication Data
US 2017/0134339 A1  May 11, 2017

(51) Int. Cl.
H04L 29/12 (2006.01)
G06F 9/455 (2018.01)

(52) U.S. Cl.
CPC ...... *H04L 61/2007* (2013.01); *G06F 9/45558* (2013.01); *H04L 61/2053* (2013.01); *G06F 2009/45595* (2013.01)

(58) Field of Classification Search
CPC ......... G06F 9/45558; G06F 2009/4557; G06F 2009/45595; G06F 3/0683; H04L 61/2007; H04L 61/2514; H04L 61/2015; H04L 61/2053
USPC ........................................................ 709/245
See application file for complete search history.

(56) References Cited

U.S. PATENT DOCUMENTS

| | | | |
|---|---|---|---|
| 8,276,140 B1* | 9/2012 | Beda, III | G06F 9/5077 709/224 |
| 8,533,343 B1* | 9/2013 | Beda, III | G06F 9/546 709/227 |
| 8,966,082 B2 | 2/2015 | Chaturvedi et al. | |
| 9,465,630 B1* | 10/2016 | Muniz | G06F 9/455 |
| 2007/0079307 A1* | 4/2007 | Dhawan | H04L 29/12584 718/1 |
| 2008/0172492 A1* | 7/2008 | Raghunath | H04L 12/467 709/229 |

(Continued)

FOREIGN PATENT DOCUMENTS

CN          103024028 A          4/2013

OTHER PUBLICATIONS

Charles M. Kozierok, "The TCP/IP Guide," Sep. 2005, tcpipguide. com, Section of "TCP/IP Dynamic Host Configuration Protocol (DHCP)", http://www.tcpipguide.com/free/t_TCPIPDynamicHostConfigurationProtocolDHCP.htm.*

(Continued)

*Primary Examiner* — Ruolei Zong
(74) *Attorney, Agent, or Firm* — Jordan T. Schiller

(57) ABSTRACT

Embodiments of the present invention provide a means for managing portable Internet Protocol (IP) addresses and virtual machine persistent storage. The invention includes defining a set of available portable IP addresses. When a request for a portable IP address is received from a first virtual machine (VM), a first portable IP address is assigned to the first VM. The assignment of the first portable IP address to the first VM extends for a predetermined amount of time and requires a lease renewal to extend the assignment.

17 Claims, 5 Drawing Sheets

(56) References Cited

U.S. PATENT DOCUMENTS

| | | | | |
|---|---|---|---|---|
| 2009/0276771 | A1* | 11/2009 | Nickolov | G06F 9/4856 |
| | | | | 717/177 |
| 2010/0180014 | A1* | 7/2010 | Kannan | H04L 29/12216 |
| | | | | 709/220 |
| 2012/0054829 | A1* | 3/2012 | Holostov | G06F 21/53 |
| | | | | 726/3 |
| 2013/0107881 | A1 | 5/2013 | Barabash et al. | |
| 2013/0283263 | A1 | 10/2013 | Elemary | |
| 2015/0052522 | A1* | 2/2015 | Chanda | G06F 9/455 |
| | | | | 718/1 |
| 2015/0128245 | A1 | 5/2015 | Brown et al. | |
| 2015/0163196 | A1* | 6/2015 | Bhagwat | H04L 61/2061 |
| | | | | 709/245 |
| 2015/0180824 | A1* | 6/2015 | Atanasov | H04L 61/2015 |
| | | | | 709/224 |

OTHER PUBLICATIONS

Bortnikov et al., "FRAPPE: Fast Replication Platform for Elastic Services", Aug. 1, 2011, 6 pages.

Chandra et al., "Paxos Made Live—An Engineering Perspective (2006 Invited Talk)", PODC'07, Aug. 12-15, 2007, pp. 398-407, ACM.

Chandra et al., "Unreliable Failure Detectors for Reliable Distributed Systems", Journal of the ACM, vol. 43, No. 2, Mar. 1996, pp. 225-267.

Gray et al., "Leases: An Efficient Fault-Tolerant Mechanism for Distributed File Cache Consistency", SOSP '89: Proceedings of the twelfth ACM symposium on Operating systems principles, Nov. 1989, pp. 202-210.

Hunt et al., "ZooKeeper: Wait-free coordination for Internet-scale systems", USENIXATC'10, Jun. 23, 2010, pp. 1-14.

Lamport, "The Part-Time Parliament", ACM Transactions on Computer Systems, vol. 16, No. 2, May 1998, pp. 133-169.

Shraer et al., "Dynamic Reconfiguration of Primary/Backup Clusters", USENIXATC'12, 2012, pp. 1-13.

Thiagarajan, "Reserved IP addresses for Cloud Services & Virtual Machines", Microsoft Azure Blog, May 14, 2014, 6 pages, <http://azure.microsoft.com/en-us/blog/reserved-ip-addresses/>.

"Amazon EBS", Printed Sep. 1, 2015, 6 pages, <http://aws.amazon.com/ebs/>.

"Block Storage", Printed Sep. 1, 2015, 3 pages, <http://www.softlayer.com/block-storage>.

"Domain Name System", Wikipedia, the free encyclopedia, last modified Aug. 31, 2015, 15 pages, <https://en.wikipedia.org/wiki/Domain_Name_System>.

"Elastic IP Addresses", AWS Documentation, Amazon Elastic Compute Cloud: User Guide for Linux (API Version Apr. 15, 2015), Printed Sep. 1, 2015, 4 pages, <http://docs.aws.amazon.com/AWSEC2/latest/UserGuide/elastic-ip-addresses-eip.html>.

"Static and Portable IP blocks", KnowledgeLayer, Printed Sep. 1, 2015, 2 pages, <http://knowledgelayer.softlayer.com/articles/static-and-portable-ip-blocks>.

Lynch, "Distributed Algorithms", 1996 Book, ACM Digital Library Abstract, Morgan Kaufmann Publishers Inc., pp. 1-3.

Junqueira et al., "ZooKeeper: Distributed Process Coordination", 1st Edition Book, Nov. 2013, 238 pages.

\* cited by examiner

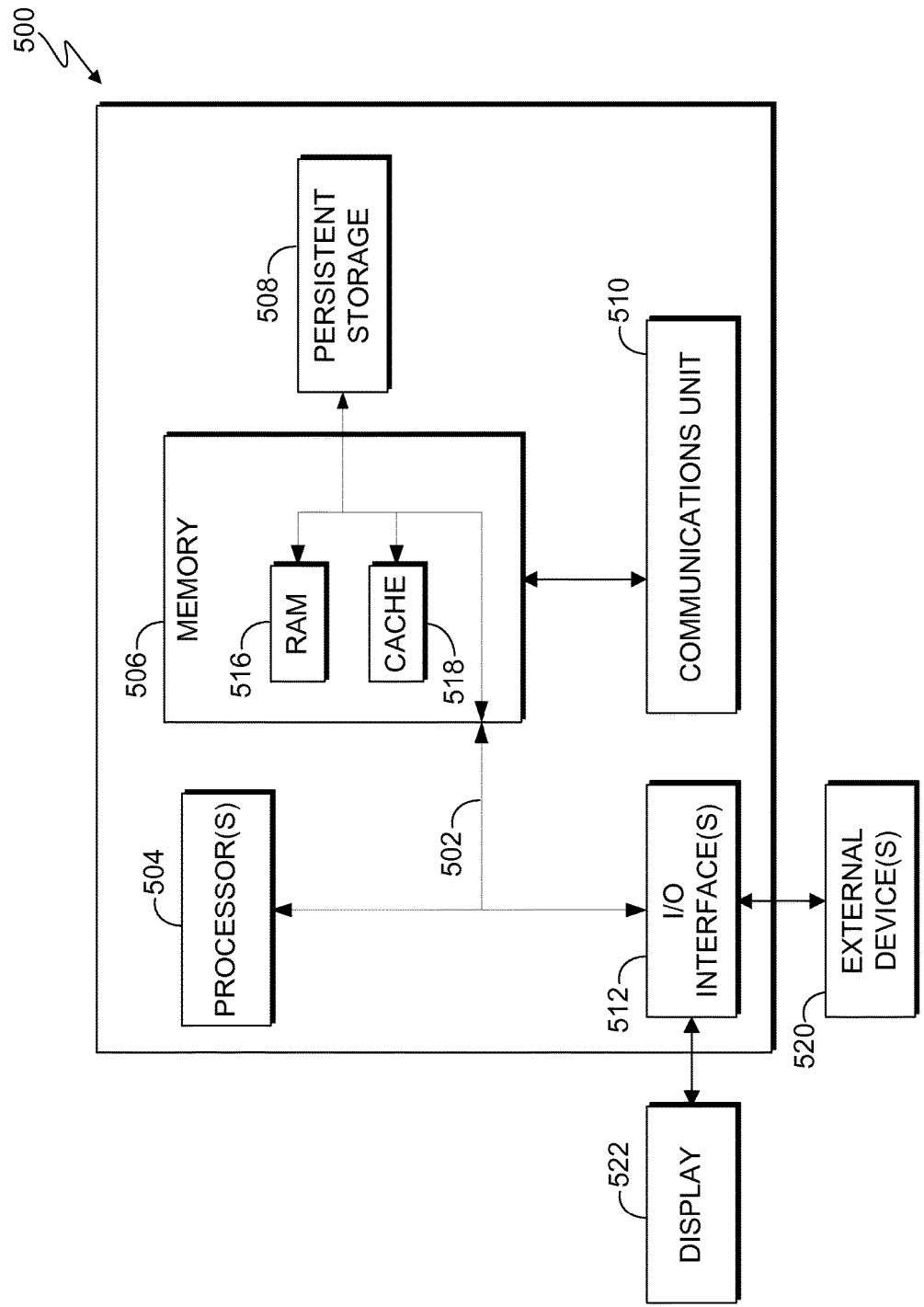

MANAGEMENT OF CLUSTERED AND REPLICATED SYSTEMS IN DYNAMIC COMPUTING ENVIRONMENTS

BACKGROUND OF THE INVENTION

The present invention relates generally to the field of cloud platform support, and more particularly to configuring clustered and replicated systems with portable Internet Protocol addresses.

An Internet Protocol (IP) address is a numerical label assigned to each device (e.g., computer, printer) participating in a computer network that uses the IP for communication. An IP address serves two principal functions: (i) host or network interface identification; and (ii) location addressing. Its role has been characterized as follows: "A name indicates what we see. An address indicates where it is. A route indicates how we get there."

SUMMARY

A method, computer program product, and computer system for managing portable Internet Protocol (IP) addresses and virtual machine persistent storage, the method comprising: defining, by one or more computer processors, a set of available portable IP addresses; receiving, by one or more computer processors, a request for a portable IP address from a first virtual machine (VM); assigning, by one or more computer processors, a first portable IP address from the set of available portable IP addresses to the first VM; determining, by one or more computer processors, whether a lease renewal has been received from the first VM; and responsive to determining that the lease renewal has not been received from the first VM, revoking, by one or more computer processors, the assignment of the first portable IP address to the first VM.

BRIEF DESCRIPTION OF THE DRAWINGS

FIG. 5 is a block diagram of internal and external components of a computer environment, in accordance with an embodiment of the present invention.

DETAILED DESCRIPTION

Figure 1:
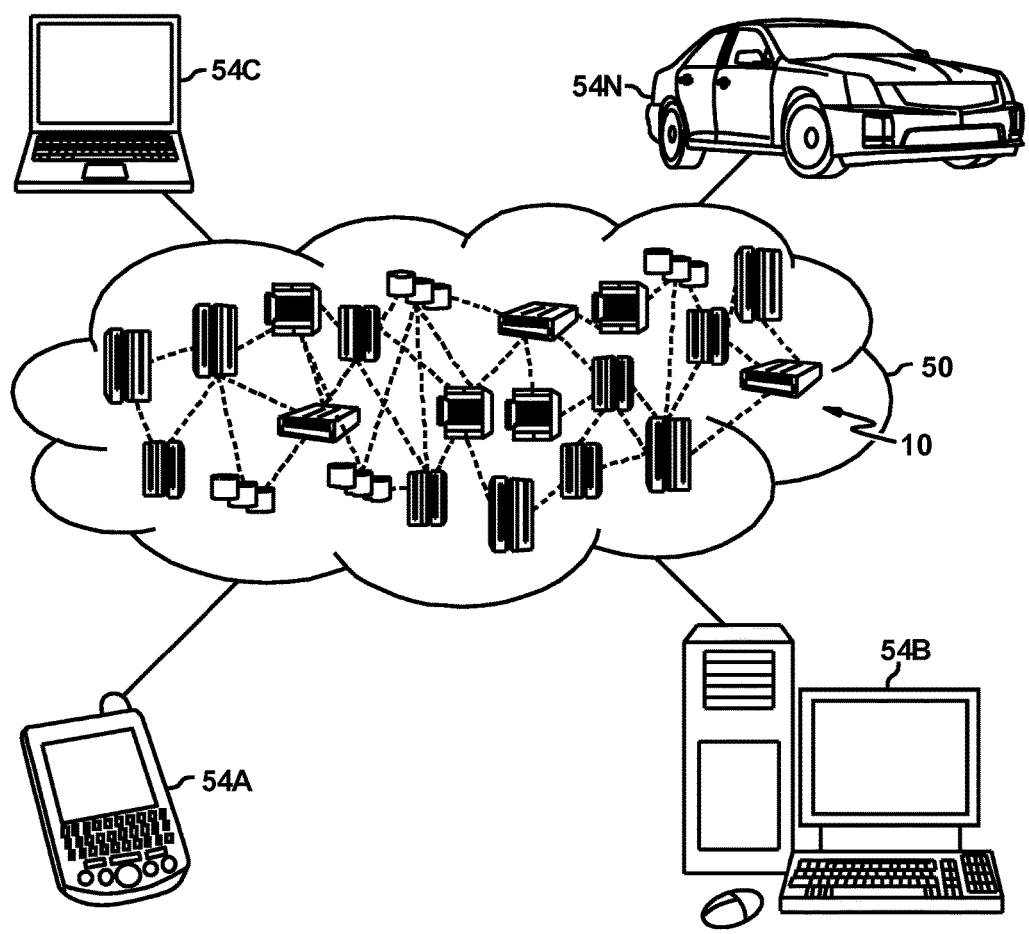
FIG. 1 depicts a cloud computing environment according to an embodiment of the present invention.

Embodiments of the present invention recognize that in virtualized cloud environments, Virtual Machines (VMs) typically get an IP address which is dynamically assigned by the cloud infrastructure when the VM is provisioned. That is, the IP address of the provisioned machine is not known at the time of provisioning. If the VM fails and a new one needs to be provisioned, it may be assigned a different IP address. However, if the new VM is provisioned such that it is to take the place of the old VM, it would be favorable to assign the new VM the same IP address assigned to the old VM. Another aspect of cloud environments is that one may decouple a VM's block storage device from the VM itself. This differs from a server with a local hard-disk. Such a decoupling is motivated by the ability to get a service level agreement (SLA) with additional performance and durability guarantees for such devices, and also the ability to continue to access the device after a particular VM has failed.

The dynamic nature of VMs and their IP addresses and storage devices in a cloud setting creates challenges for many systems that assume a more static environment. Many clustered and replicated systems developed before the cloud era assume a static set of machines with fixed IP addresses and storage devices. Such systems are built while making the assumption that the set of IP addresses comprising the cluster is fixed and unchanging. Even if a machine fails, it is assumed that the replacement will have the same IP address as the old machine. This is because in the world of physical machines, that in fact was the case. However, in virtualized and cloud environments, these assumptions typically no longer hold true. Cloud platforms may provide features to help with some of the challenges posed by the dynamic assignment of IP addresses. However cloud platforms in general do not provide any mechanisms to coordinate between VMs and their use of portable IP addresses. For example, if a VM is determined to have failed (but in reality has not) and a replacement VM is provisioned, the two VMs may associate themselves with the same portable IP address at the same time. This is also true of managing virtual storage devices, when a network issue might lead to two VMs concurrently accessing the same storage device.

Embodiments of the present invention provide a mechanism and service for coordinated management of portable IP addresses and virtual machine persistent storage so as to enable high availability and automated recovery of clustered and replicated systems running in a dynamic cloud environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
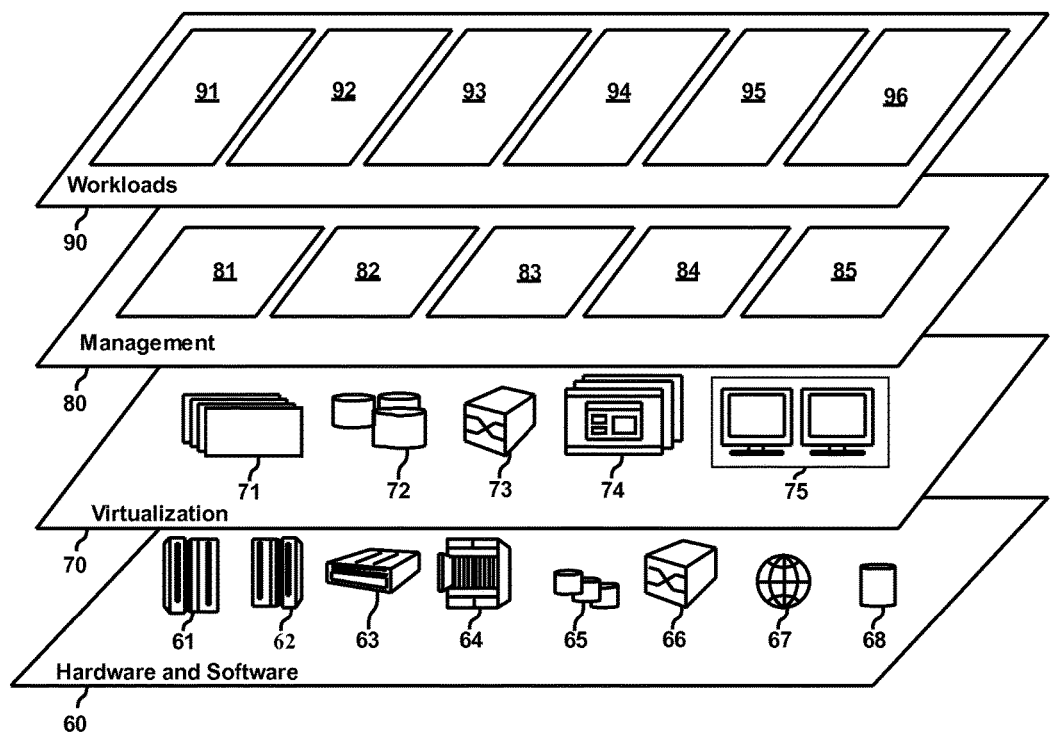
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cluster and replicated systems configuration 96.

Figure 3:
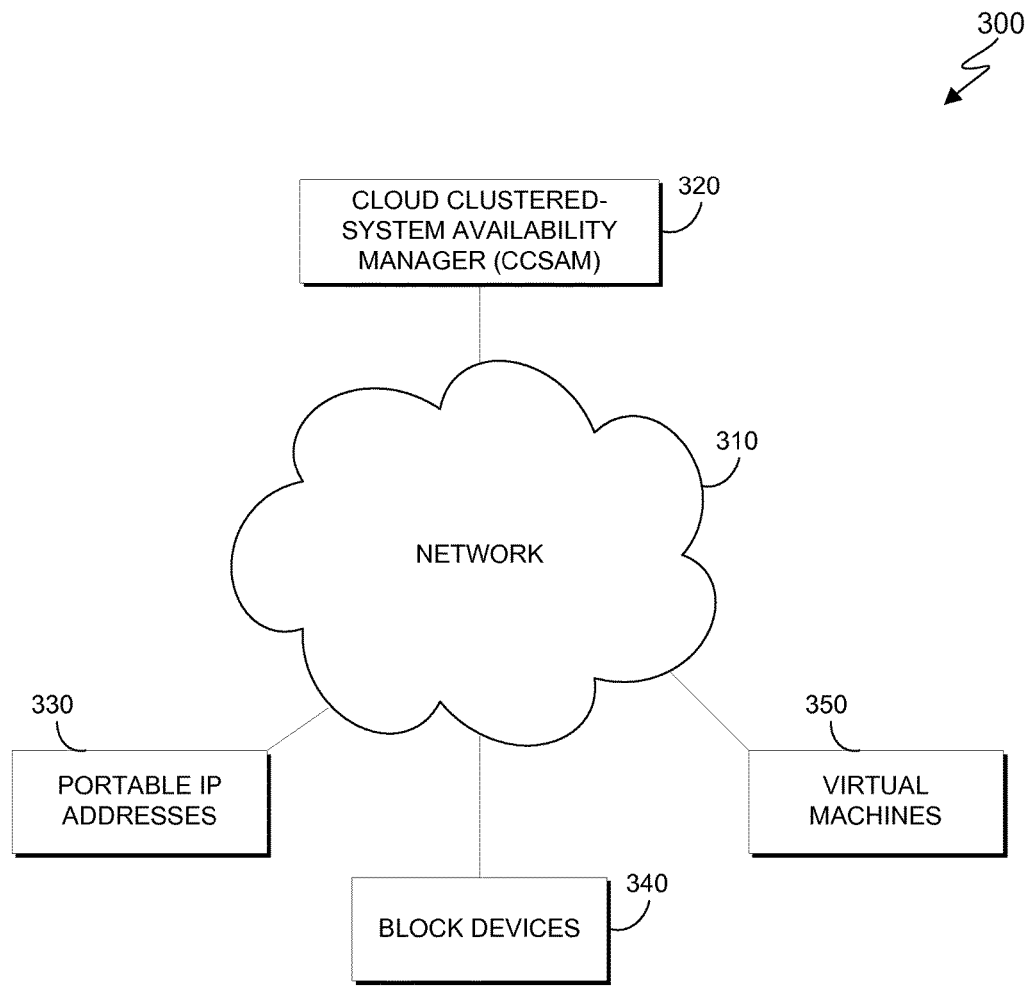
FIG. 3 is a functional block diagram illustrating a computing environment, in accordance with an embodiment of the present invention.

The present invention will now be described in detail with reference to cluster and replicated systems configuration layer 96. FIG. 3 is a functional block diagram illustrating a computing environment, generally designated 300, in accordance with one embodiment of the present invention. FIG. 3 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing environment 300 includes cloud clustered-system availability manager (CCSAM) 320, portable internet protocol (IP) addresses 330, block devices 340, and virtual machines (VMs) 350, all interconnected over network 310.

Network 310 can be, for example, a local area network (LAN), a wide area network (WAN) such as the Internet, or a combination of the two, and can include wired, wireless, or fiber optic connections. In general, network 310 can be any combination of connections and protocols that will support communication between CCSAM 320, portable IP addresses 330, block devices 340, and VMs 350.

CCSAM 320 is charged with managing portable IP addresses 330, block devices 340, and VMs 350 so as to maintain the basic invariants and assumptions that are depended upon by static clustering/replication systems. CCSAM 320 may also provide automation of recovery for such systems. CCSAM 320 allocates portable IP addresses and VM storage devices to VMs. CCSAM 320 may be configured to manage multiple different clustered systems. CCSAM 320 is a clustered system and may run in the cloud, or even be considered in itself, a cloud service. CCSAM 320 may provide IP management services to itself. In this case, as long as a majority of the cluster nodes are up and running, CCSAM 320 may consume its own services just as it would have used an external manager. It should be appreciated that any resource that requires such invariants can be managed by this approach, and that this invention is not limited to the management of portable IP addresses 330, block devices 340, and virtual machines 350.

Portable IP addresses 330 are IP addresses that can be used on multiple servers. A portable IP address may be provisioned from the cloud platform that reserves the IP address for use. Once a user obtains such an IP address, VMs 350 may dynamically associate with the obtained IP address by creating a new virtual network interface. After this association is complete, other entities on the network will be able to direct TCP/IP traffic to the VM by using its portable IP address (in addition to any other IP address the VM might have).

Block devices 340 are persistent data volumes separate from VMs 350. Cloud platforms commonly support the ability to provision persistent data volumes separate from VMs. In an exemplary embodiment, CCSAM 320 assigns block devices 340 to VMs 350. CCSAM 320 maintains that any particular data volume is only ever assigned to, at most, a single VM at any one time. CCSAM 320 can also maintain that once a VM block device is assigned to a VM with a portable IP address, CCSAM 320 assigns the VM block device to the VM with this portable IP address. For example, if a VM block device is assigned to a VM with portable IP address X, then CCSAM 320 assigns that VM block device to a VM with portable IP address X. In this exemplary embodiment, if a VM accessing block device X is considered to have failed by CCSAM 320, then CCSAM 320 can shut down the old VM (to make sure it is dead) and then provision a new VM. It should be appreciated that VM block device management is coordinated with portable IP address management so that configured pairing between VM block devices and portable IP addresses is continuously maintained.

VMs 350 include the available and unavailable virtual machines for a system. In an exemplary embodiment, CCSAM 320 monitors VM availability and ensures that for every configured portable IP address there is a running VM configured with that IP address. If an old VM is thought to have failed, CCSAM 320 configures a new VM. CCSAM 320 may also shut down the old VM as previously discussed.

Figure 4:
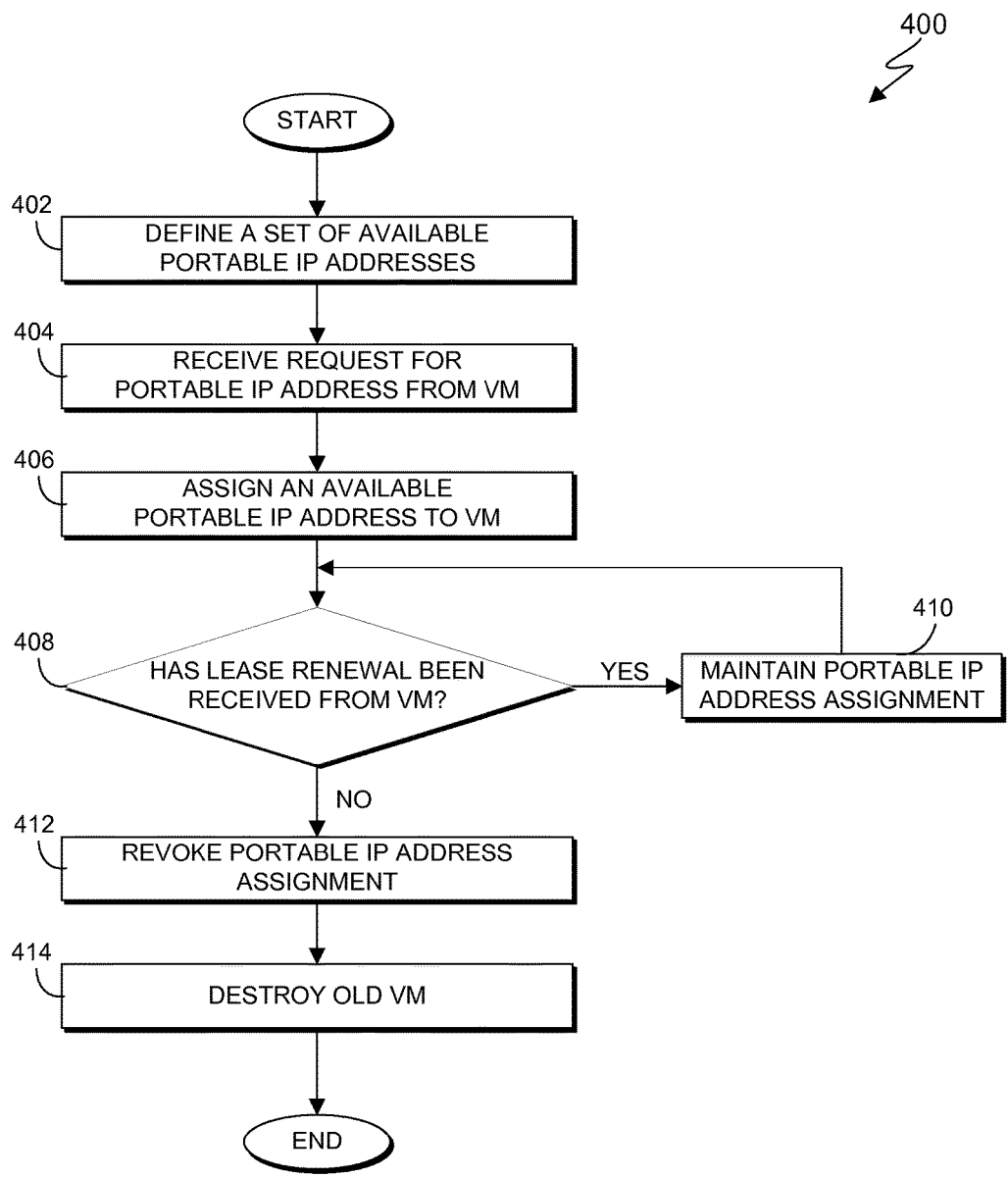
FIG. 4 is a flowchart depicting operational steps of the portable IP address management process, in accordance with an embodiment of the present invention.

FIG. 4 is a flowchart, 400, depicting the operational steps of the portable IP address management process, in accordance with an embodiment of the present invention.

In step 402, CCSAM 320 defines a set of available portable IP addresses for each cluster. The set of available portable IP addresses are defined by a system administrator a priori. In this exemplary embodiment, CCSAM 320 maintains the mapping from portable IP addresses in the cluster's set to the VMs the portable IP addresses are assigned to. Each portable IP address may be assigned to, at most, one VM. Each set of portable IP addresses may be assigned to one cluster at a time, however, a set may be broken down into subsets and assigned to a plurality of clusters. For example, for a set of ten portable IP addresses, CCSAM 320 can assign five portable IP addresses to one cluster and five portable IP addresses to another cluster.

In step 404, CCSAM 320 receives a request for a new portable IP address from a VM. In this exemplary embodiment, on receipt of a request for a portable IP from a VM, CCSAM 320 attempts to find an unallocated IP address in the IP address range defined for the cluster (step 402). CCSAM 320 maintains that concurrent requests do not result in allocation of the same portable IP address to more than a single VM. This invariant can hold even if CCSAM 320 is distributed across multiple replicas and the requests arrive to different replicas of the manger.

In step 406, CCSAM 320 assigns an available portable IP address it to the requesting VM. In this exemplary embodiment, CCSAM 320 maintains the invariant that at most a single VM holds a certain portable IP address. It should be appreciated that any suitable algorithm can be used to ensure that the invariant holds. CCSAM 320 can also ensure that some VM is running for every configured portable IP address. For example, a new VM for portable IP address X is configured if the old VM fails. In one embodiment, when a client on the VM requests a new portable IP address from CCSAM 320, CCSAM 320 searches for an available portable IP address and creates a "lock" on the entry of this portable IP address. As long as the lock holds (i.e., as long as the corresponding client on the VM renews the lease on time), the lock is maintained and this portable IP address will not be available to be assigned to any other VM. It should be appreciated that it is the client on the VM that would periodically renew the lease and thereby cause CCSAM 320 to maintain the lock for another lease period.

In step 408, CCSAM 320 determines whether a lease renewal has been received from a VM. In this exemplary embodiment, leases are used to ensure the invariant that at any given time, at most, a single VM holds a specific portable IP address. This means that the portable IP address is assigned to a VM for some predetermined period of time and the VM must periodically renew its lease on this IP. It should be appreciated that a client on the VM is responsible for sending a lease renewal request to CCSAM 320 for a given portable IP address on time (i.e., within the lease renewal period). If the lease renewal request is sent on time, CCSAM 320 maintains the lock and the invariant holds.

If, in step 408, CCSAM 320 determines that a lease renewal has been received from the VM, then in step 410 CCSAM 320 maintains the portable IP address assigned to that VM. In this exemplary embodiment, CCSAM 320 maintains the portable IP address for the duration of another lease term.

If, in step 408, CCSAM 320 determines that a lease renewal has not been received from the VM, then in step 412 CCSAM 320 revokes the portable IP address assigned to that VM. In this exemplary embodiment, if a VM fails to renew its lease by the end of the predetermined period of time then CCSAM 320 revokes the portable IP address assignment to that VM. For example, if the lease on a portable IP address assignment is not renewed, CCSAM 320 may assume that the original VM holding the portable IP address no longer holds that portable IP address and CCSAM 320 can assign the portable IP address to a different VM.

In step 414, CCSAM 320 destroys the old VM. Lease based mechanisms are time-based and as such are susceptible to unexpected behavior of system clocks. Computer system clocks, especially in virtualized cloud environments, may not behave as expected due to, for example, load on the machine or intricacies of virtualized environments. In order to deal with such issues, CCSAM 320 may optionally issue a command to the cloud platform to destroy the VM which previously held a portable IP address. In this exemplary embodiment, CCSAM 320 performs step 414 on expiration of a portable IP address assignment lease. In another embodiment, CCSAM 320 can perform step 414 when a free portable IP address is assigned to a new VM (i.e., destroy the VM that was previously assigned that portable IP address). CCSAM 320 can utilize step 414 to help ensure the invariant that only one portable IP address is assigned to only one VM.

FIG. 5 is a block diagram of internal and external components of computing device 500, which is representative of the computing devices of FIG. 3, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 500 includes communications fabric 502, which provides for communications between one or more processing units 504, memory 506, persistent storage 508, communications unit 510, and one or more input/output (I/O) interfaces 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computerreadable storage medium that is also part of persistent storage 508.

Communications unit 510 provides for communications with other computer systems or devices via a network. In this exemplary embodiment, communications unit 510 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 500 through communications unit 510 (i.e., via the Internet, a local area network, or other wide area network). From communications unit 510, the software and data can be loaded onto persistent storage 508.

One or more I/O interfaces 512 allow for input and output of data with other devices that may be connected to computing device 500. For example, I/O interface 512 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 512 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing portable Internet Protocol (IP) addresses and virtual machine persistent storage in a cloud computing environment, the method comprising:

receiving, by one or more computer processors, a request for a first portable IP address from a first VM, wherein concurrent requests do not result in allocation of the first portable IP address to more than the first VM;

determining, by one or more computer processors, an available IP address within an IP address range, wherein the IP address range is defined for a cluster containing the first VM;

creating, by one or more computer processors, a lock on an entry of the determined available IP address within the IP address range;

assigning, by one or more computer processors, the determined available IP address to the first VM, wherein assigning the determined available IP address to the first VM comprises a configured pairing of the available portable IP address and a first persistent data volume to the first VM;

renewing, by one or more computer processors, a lease on the determined available IP address to the first VM, wherein renewing the lease maintains the lock on the entry of the assigned configured pairing of the available IP address to the first VM;

in response to determining that the lease renewal has been received from the first VM, maintaining, by one or more computer processors, the assignment of the configured pairing to the first VM;

persisting, by one or more computer processors, the configured pairing upon revoking assignment of the configured pairing to the first VM; and managing, by one or more computer processors, allocation of one or more portable IP addresses to one or more VMs to maintain basic invariants that are depended upon by static clustering systems, and wherein leases are used to ensure that the one or more VMs are not concurrently using a same portable IP address.

2. The method of claim 1, further comprising:
destroying, by one or more computer processors, the first VM if the first VM is suspected of no longer functioning.

3. The method of claim 1, wherein a lease is a predetermined period of time in which the first portable IP address is assigned to the first VM.

4. The method of claim 1, further comprising:
determining, by one or more computer processors, that the first VM has failed, wherein the first VM has been assigned the configured pairing;
assigning, by one or more computer processors, the configured pairing to a second VM; and
destroying, by one or more computer processors, the first VM.

5. The method of claim 1, further comprising:
defining, by one or more computer processors, a set of available portable IP addresses, of which the first portable IP address is a member.

6. The method of claim 1, further comprising:
locking, by one or more computer processors, the assignment of the configured pairing to the first VM, wherein locking the assignment prevents the configured pairing from being assigned to another VM;
determining, by one or more computer processors, whether a lease renewal has been received from the first VM;
responsive to determining that the lease renewal has not been received from the first VM, unlocking the assignment of the configured pairing to the first VM; and
responsive to determining that the lease renewal has not been received from the first VM, revoking, by one or more computer processors, the assignment of the configured pairing to the first VM.

7. A computer program product for managing portable Internet Protocol (IP) addresses and virtual machine persistent storage in a cloud computing environment, the computer program product comprising:

one or more non-transitory computer-readable tangible storage devices and program instructions stored on at least one of the one or more tangible storage devices, the program instructions comprising:

program instructions to receive a request for a first portable IP address from a first VM, wherein concurrent requests do not result in allocation of the first portable IP address to more than the first VM;

program instructions to determine an available IP address within an IP address range, wherein the IP address range is defined for a cluster containing the first VM;

program instructions to create a lock on an entry of the determined available IP address within the IP address range;

program instructions to assign the determined available IP address to the first VM, wherein assigning the determined available IP address to the first VM comprises a configured pairing of the available portable IP address and a first persistent data volume to the first VM;

program instructions to renew a lease on the determined available IP address to the first VM, wherein renewing the lease maintains the lock on the entry of the assigned configured pairing of the available IP address to the first VM;

program instructions to, in response to determining that the lease renewal has been received from the first VM, maintain the assignment of the configured pairing to the first VM;

program instructions to persist the configured pairing upon revoking assignment of the configured pairing to the first VM; and program instructions to manage allocation of one or more portable IP addresses to one or more VMs to maintain basic invariants that are depended upon by static clustering systems, and wherein leases are used to ensure that the one or more VMs are not concurrently using a same portable IP address.

8. The computer program product of claim 7, further comprising:
program instructions to destroy the first VM if the first VM is suspected of no longer functioning.

9. The computer program product of claim 7, wherein a lease is a predetermined period of time in which the first portable IP address is assigned to the first VM.

10. The computer program product of claim 7, further comprising:
program instructions to determine that the first VM has failed, wherein the first VM has been assigned the configured pairing;
program instructions to assign the configured pairing to a second VM; and
program instructions to destroy the first VM.

11. The computer program product of claim 7, further comprising:

program instructions to define a set of available portable IP addresses, of which the first portable IP address is a member.

12. The computer program product of claim 7, further comprising:
program instructions to lock the assignment of the configured pairing to the first VM;
program instructions to determine whether a lease renewal has been received from the first VM;
program instructions to unlock the assignment of the configured pairing to the first VM, in response to determining that the lease renewal has not been received from the first VM; and
program instructions to revoke the assignment of the configured pairing to the first VM, in response to determining that the lease renewal has not been received from the first VM.

13. A computer system for managing portable Internet Protocol (IP) addresses and virtual machine persistent storage in a cloud computing environment, the computer system comprising:
one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:
program instructions to receive a request for a first portable IP address from a first VM, wherein concurrent requests do not result in allocation of the first portable IP address to more than the first VM;
program instructions to determine an available IP address within an IP address range, wherein the IP address range is defined for a cluster containing the first VM;
program instructions to create a lock on an entry of the determined available IP address within the IP address range;
program instructions to assign the determined available IP address to the first VM, wherein assigning the determined available IP address to the first VM comprises a configured pairing of the available portable IP address and a first persistent data volume to the first VM;
program instructions to renew a lease on the determined available IP address to the first VM, wherein renewing the lease maintains the lock on the entry of the assigned configured pairing of the available IP address to the first VM;
program instructions to, in response to determining that the lease renewal has been received from the first VM, maintain the assignment of the configured pairing to the first VM;
program instructions to persist the configured pairing upon revoking assignment of the configured pairing to the first VM; and
program instructions to manage allocation of one or more portable IP addresses to one or more VMs to maintain basic invariants that are depended upon by static clustering systems, and wherein leases are used to ensure that the one or more VMs are not concurrently using a same portable IP address.

14. The computer system of claim 13, further comprising:
program instructions to destroy the first VM if the first VM is suspected of no longer functioning.

15. The computer system of claim 13, wherein a lease is a predetermined period of time in which the first portable IP address is assigned to the first VM.

16. The computer system of claim 13, further comprising:
program instructions to determine that the first VM has failed, wherein the first VM has been assigned the configured pairing;
program instructions to assign the configured pairing to a second VM; and
program instructions to destroy the first VM.

17. The computer system of claim 13, further comprising:
program instructions to lock the assignment of the configured pairing to the first VM;
program instructions to determine whether a lease renewal has been received from the first VM;
program instructions to unlock the assignment of the configured pairing to the first VM, in response to determining that the lease renewal has not been received from the first VM; and
program instructions to revoke the assignment of the configured pairing to the first VM, in response to determining that the lease renewal has not been received from the first VM.

* * * * *